(12) United States Patent
Anderson et al.

(10) Patent No.: US 9,259,996 B2
(45) Date of Patent: Feb. 16, 2016

(54) SIDE DOOR EXTENSION SUPPORT ASSEMBLY

(71) Applicant: Honda Motor Co., Ltd., Tokyo (JP)

(72) Inventors: Erik R. Anderson, Marysville, OH (US); Steven R. Thiele, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 14/033,675

(22) Filed: Sep. 23, 2013

(65) Prior Publication Data
US 2015/0084366 A1 Mar. 26, 2015

(51) Int. Cl.
*B60J 5/06* (2006.01)
*E05D 15/06* (2006.01)

(52) U.S. Cl.
CPC ............... *B60J 5/06* (2013.01); *E05D 15/0621* (2013.01)

(58) Field of Classification Search
CPC .............................. B60J 5/06; E05D 15/0621
USPC ......................................... 296/146.1, 146.11
See application file for complete search history.

(56) References Cited

U.S. PATENT DOCUMENTS

| | | | |
|---|---|---|---|
| 6,036,257 A * | 3/2000 | Manuel | B60J 5/06 296/155 |
| 6,362,735 B2 * | 3/2002 | Sicuranza | 250/221 |
| 6,711,856 B1 | 3/2004 | Hoffman | |
| 6,744,365 B2 | 6/2004 | Sicuranza | |
| 6,883,856 B2 | 4/2005 | Burkat et al. | |
| 7,137,662 B2 | 11/2006 | Nakayama et al. | |
| 7,156,454 B1 | 1/2007 | Dogan | |
| 8,353,555 B2 | 1/2013 | Boettcher | |
| 2008/0129085 A1 * | 6/2008 | Kim et al. | 296/155 |

* cited by examiner

*Primary Examiner* — Glenn Dayoan
*Assistant Examiner* — Melissa A Black
(74) *Attorney, Agent, or Firm* — Rankin, Hill & Clark LLP

(57) ABSTRACT

A side door extension support assembly for a vehicle includes a side door movably mounted on a vehicle body of the vehicle and an extension member mounted to the vehicle body. The side door is longitudinally moveable between a closed position and an open position. The extension member is moveable between a retracted position and an extended position for supporting the side door. Movement of the extension member corresponds to movement of the side door such that the extension member moves to the extended position when the side door is moved from the closed position to the open position, and the extension member moves to the retracted position when the side door is moved from the open position to the closed position.

19 Claims, 8 Drawing Sheets

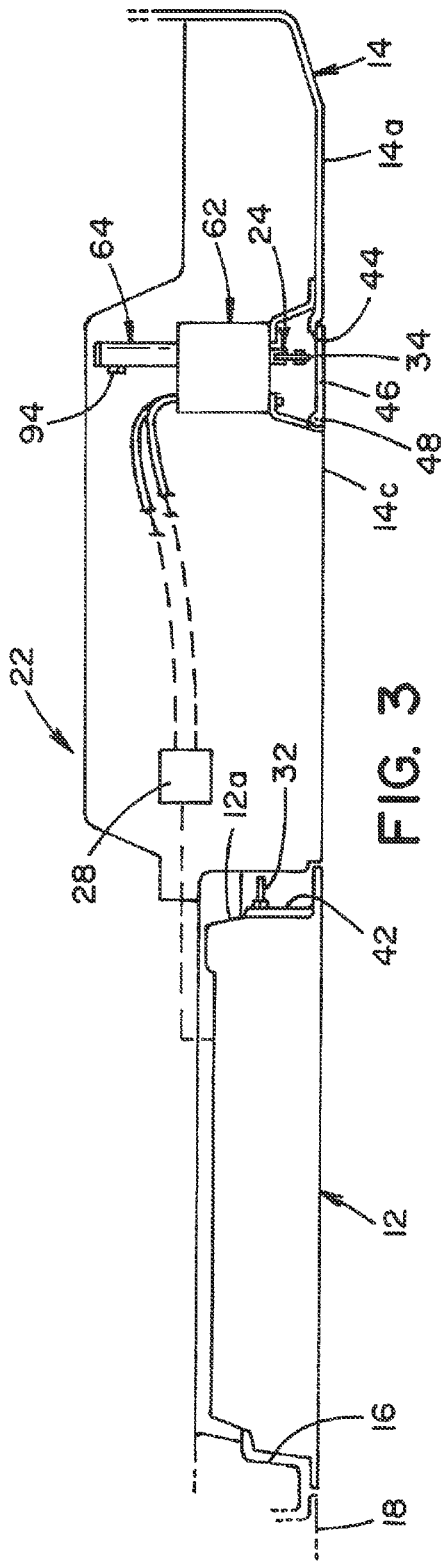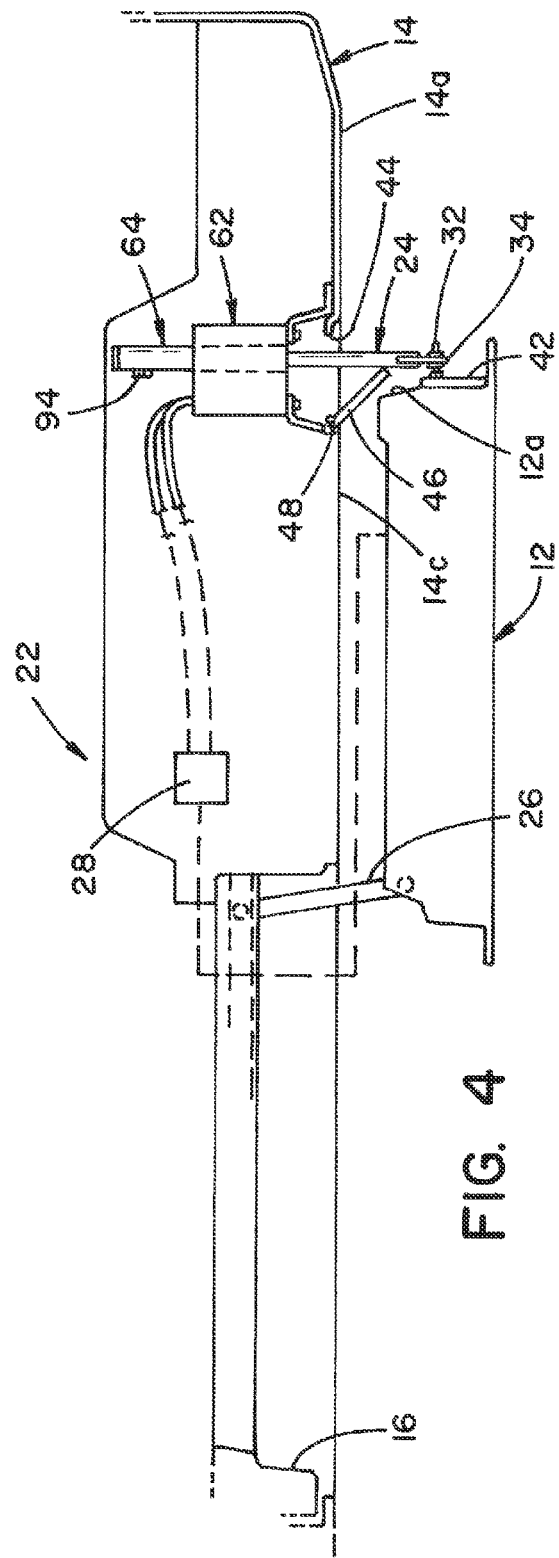

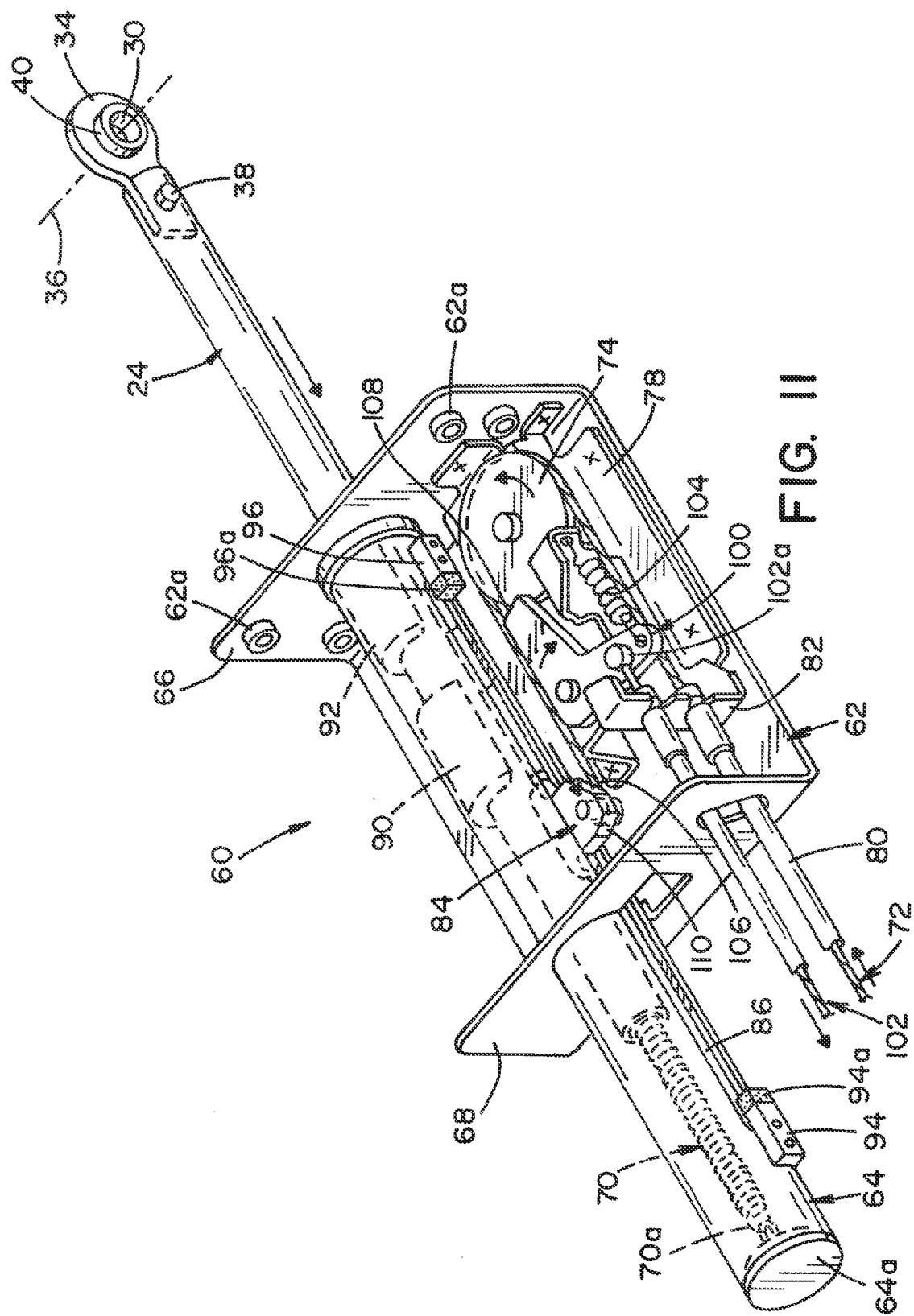

SIDE DOOR EXTENSION SUPPORT ASSEMBLY

BACKGROUND

Side doors on vehicles (e.g., minivans) continue to evolve. One advancement is the use of four-bar linkages to control movement of the side door when the door is moved longitudinally between closed and open positions. Such opening mechanisms potentially result in the side door having a lower stiffness as compared to conventional three-rail side doors. Such lower stiffness is particularly noticeable when the side door is pushed or pulled at the rear-most edge thereof. This potentially creates a negative impact in perceived quality by the customer when pushing or pulling on the side door, which has the potential to give the impression that the door is "cheap" or structurally flimsy, whether this perception is actual or not. Additionally, some market case studies have shown that rigidity of side vehicle doors is important to customers, in particular as concerns leaning against a fully open door and/or waxing the side door when in the open state.

SUMMARY

According to one aspect, a side door extension support assembly for a vehicle includes a side door movably mounted on a vehicle body of the vehicle and an extension member mounted to the vehicle body. The side door is longitudinally moveable between a closed position and an open position. The extension member is moveable between a retracted position and an extended position for supporting the side door. Movement of the extension member corresponds to movement of the side door such that the extension member moves to the extended position when the side door is moved from the closed position to the open position, and the extension member moves to the retracted position when the side door is moved from the open position to the closed position.

According to another aspect, a side door assembly on a vehicle includes a side door mounted on a lateral side of the vehicle for closing a door opening providing ingress and egress for the vehicle. The side door is longitudinally moveable from a closed position wherein the side door closes the door opening to an open position wherein the side door is removed from the door opening. The side door assembly further includes an extension member mounted on the lateral side of the vehicle rearwardly of the door opening for supporting the side door when the side door is in the open position. The extension member is moveable from a retracted position to an extended position when the side door is longitudinally moved to the open position.

According to a further aspect, a side door extension support method for a vehicle is provided. More particularly, in accordance with the method, a side door movably mounted on the vehicle for longitudinal movement between a closed position and an open position is provided. An extension member mounted to the vehicle for movement between a retracted position and an extended position for supporting the side door is also provided. The side door is moved between the closed position and the open position. The extension member is moved between the retracted position and the extended position based on movement of the side door. The extension member is moved to the extended position when the side door is moved from the closed position to the open position and the extension member is moved to the retracted position when the side door is moved from the open position to the closed position.

BRIEF DESCRIPTION OF THE DRAWINGS

FIG. 3 is a cross-sectional view taken along the line 3-3 of FIG. 1 showing an extension member that is mounted to the vehicle in a retracted position.

FIG. 4 is a cross-sectional view taken along the line 4-4 of FIG. 2 showing the extension member in an extended position cooperatively engaged with the side door.

FIG. 11 is still another perspective view of the movement control mechanism similar to FIG. 8 but showing the extension member moving toward the retracted position.

DETAILED DESCRIPTION

Figure 1:
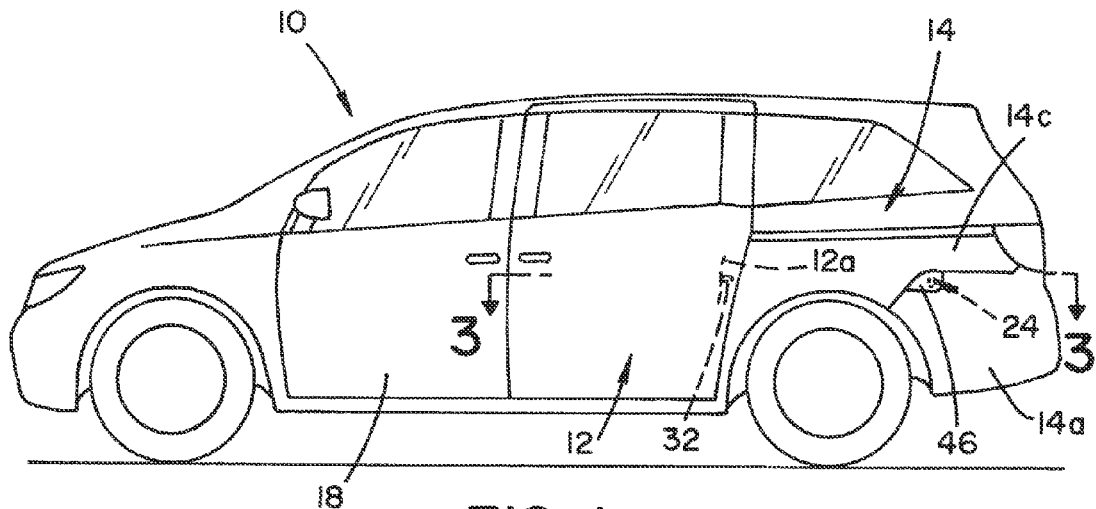
FIG. 1 is a side elevation view of a vehicle having a side door moveably mounted thereon for longitudinal movement shown in a closed position.
Figure 2:
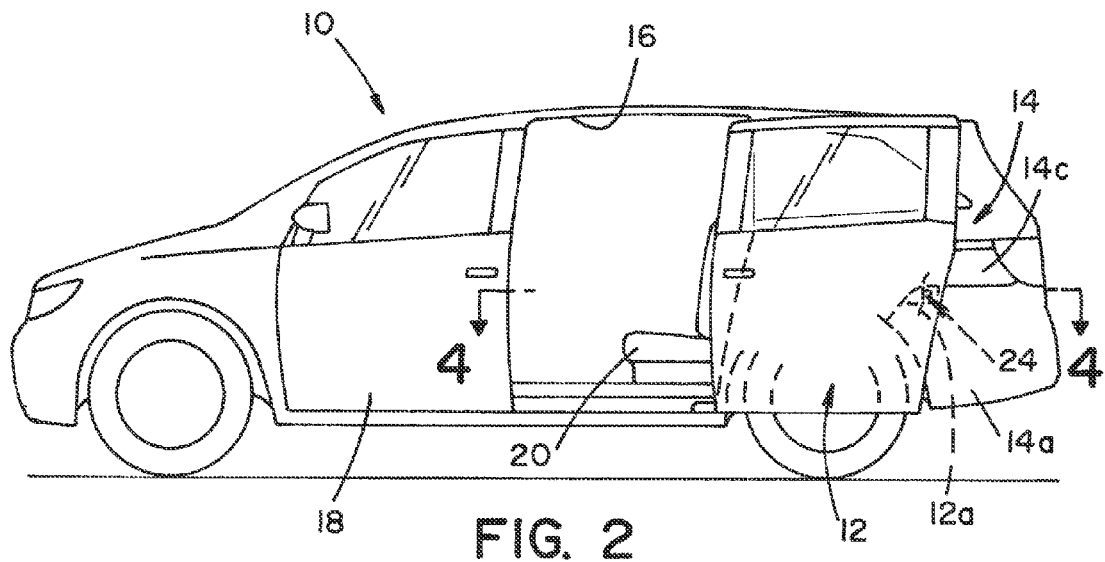
FIG. 2 is a side elevation view of the vehicle similar to FIG. 1 but showing the side door in an open position.

Referring now to the drawings wherein the showings are for purposes of illustrating one or more exemplary embodiments and not for purposes of limiting the same, FIGS. 1 and 2 illustrate a vehicle 10 having a side door 12 movably mounted on a vehicle body 14 of the vehicle 10 and longitudinally moveable between a closed position (shown in FIG. 1) and an open position (shown in FIG. 2). As used herein, the term "longitudinally movable" corresponds to a longitudinal dimension for the vehicle 10 and/or to a direction of travel for the vehicle 10. As shown in the illustrated embodiment, the side door 12 may be laterally moveable in addition to being longitudinally moveable as will be known and understood by those skilled in the art. For example, the side door 12 may move laterally outward to enable the side door 12 to move from the closed position longitudinally rearward relative to the vehicle 10 to the open position. As shown, the illustrating side door 12 is mounted on a lateral side (i.e., the side shown in FIGS. 1 and 2) of the vehicle 10 for closing a door opening 16 providing ingress and egress for the vehicle 10 and thus the side door 12 moves longitudinally relative to the door opening 16.

As shown, the door opening 16 and the side door 12 provided in association with the door opening 16 are arranged rearward to a front door 18 and specifically provide ingress and egress for the vehicle 10 in association with a rear row of seats 20 (FIG. 2) disposed within the vehicle 10. In particular, the side door 12 is longitudinally moveable from the closed position shown in FIG. 1 wherein the side door 12 closes the door opening 16 to the open position shown in FIG. 2 wherein the side door 12 is removed or displaced from the door opening 16 and moved rearward relative thereto. As shown, the side door 12 can be displaced rearwardly relative to a forward direction of travel for the vehicle 10 when the side door 12 is opened and displaced forwardly relative to a forward direction of travel for the vehicle 10 when the side door 12 is closed.

With additional reference to FIGS. 3 and 4, the side door 12 can be comprised as part of a side door extension support assembly 22, which is also referred to herein as a side door assembly 22 on the vehicle 10. In one embodiment, the side door extension support assembly 22 includes a four-bar linkage (only link 26 shown) for controlling movement of the side door 12 between the open and closed positions as will be known and understood by those skilled in the art, though this is not required and other mechanisms can be used for controlling movement of the side door 12. In addition to including the side door 12, the side door extension support assembly 22 can further include an extension member 24 mounted to the vehicle body 14 and moveable between a retracted position (shown in FIG. 3) and in extended position (shown in FIG. 4) for supporting the side door 12, particularly when the side door 12 is in the open position.

In the illustrated embodiment, the extension member 24 is shown mounted on the illustrated lateral side (i.e., side illustrated in FIGS. 1 and 2) of the vehicle 10 rearwardly of the door opening 16 for supporting the side door 12 when the side door 12 is in the open position. More particularly, the extension member 24 is laterally moveable from the retracted position to the extended position when the side door 12 is longitudinally moved to the open position. Likewise, the extension member 24 is laterally moveable from the extended position to the retracted position when the side door is longitudinally moved to the closed position. In one embodiment, as will be described in more detail below, lateral movement of the extension member 24 is linked to longitudinal movement of the side door 12 (or movement of the side door 12 between the open and closed positions) through a door actuator 28.

Accordingly, and as will be described in more detail below, movement of the extension member 24 can correspond to movement of the side door 12 such that the extension member 24 moves to the extended position when the side door 12 is moved from the closed position to the open position, and the extension member 24 moves to the retracted position when the side door 12 is moved from the open position to the closed position. Advantageously, the foregoing provides support to the side door 12 when necessary but retracts back into the vehicle body 14 of the vehicle 10 during closing of the side door 12 thereby maintaining the overall width of the vehicle 10 and its styled appearance. The door actuator 28 can mechanically or otherwise link movement of the side door 12 to the extension member (e.g., via cables 72, 102) so that the position of the side door 12 and/or movement of the side door 12 toward one of the open or closed positions is communicated and transferred into lateral movement of the extension member 24. In another embodiment, the door actuator 28 can be electronically controlled to link movement of the side door 12 to the extension member 24.

Figure 5:
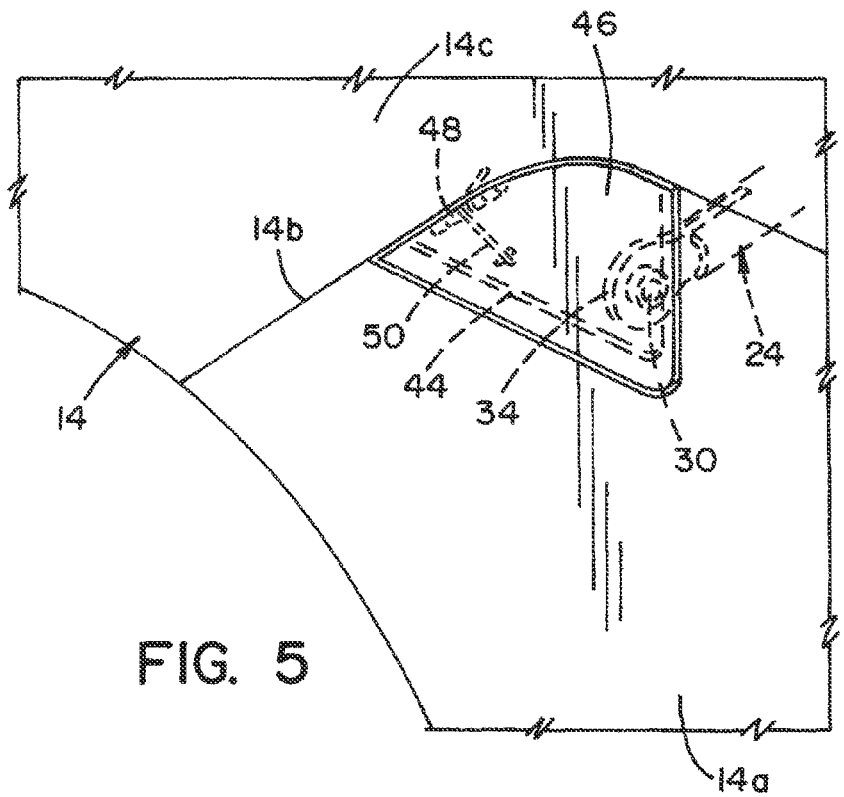
FIG. 5 is a partial schematic perspective view showing the extension member in the retracted position behind a moveable cover shown, which itself is shown in a closed position.
Figure 6:
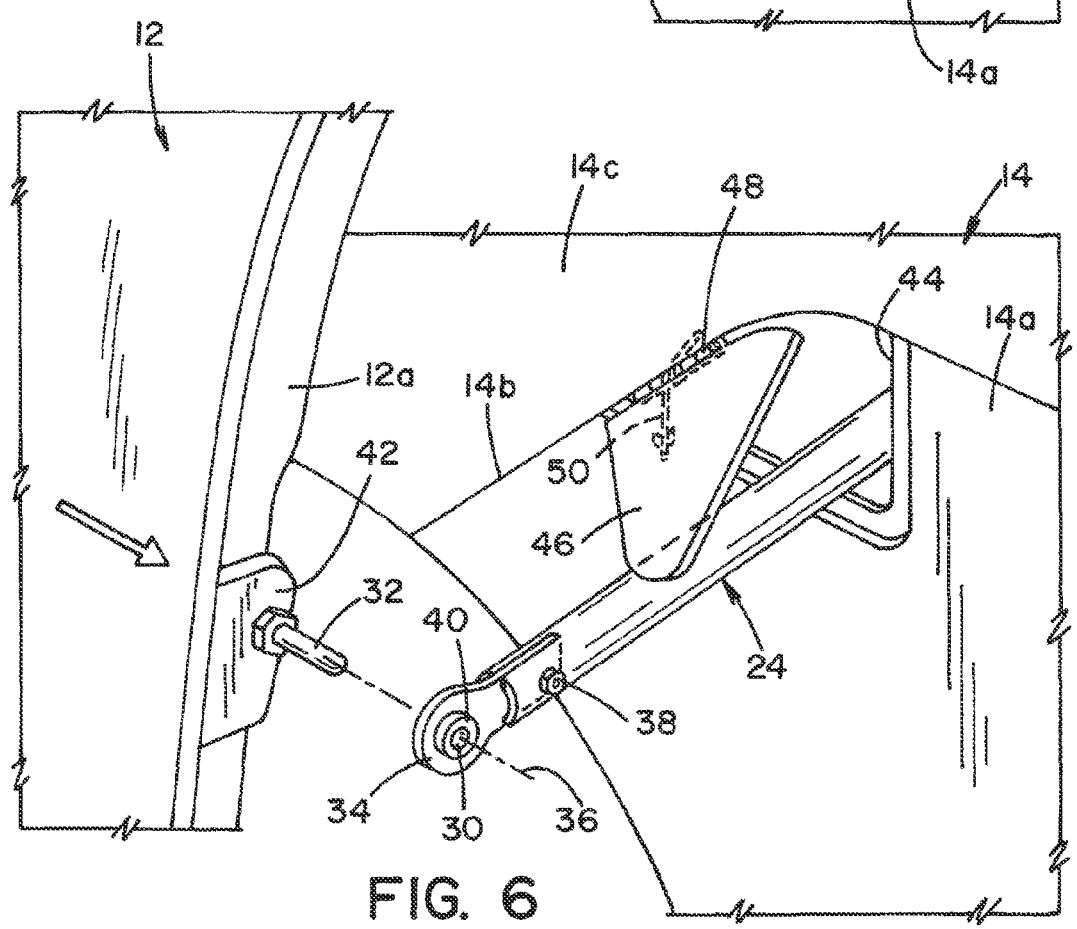
FIG. 6 is a partial schematic perspective view similar to FIG. 5 but showing the extension member in the extended position with the moveable cover in an open position, and further showing the side door moving toward the extension member for cooperative engagement therewith.
Figure 7:
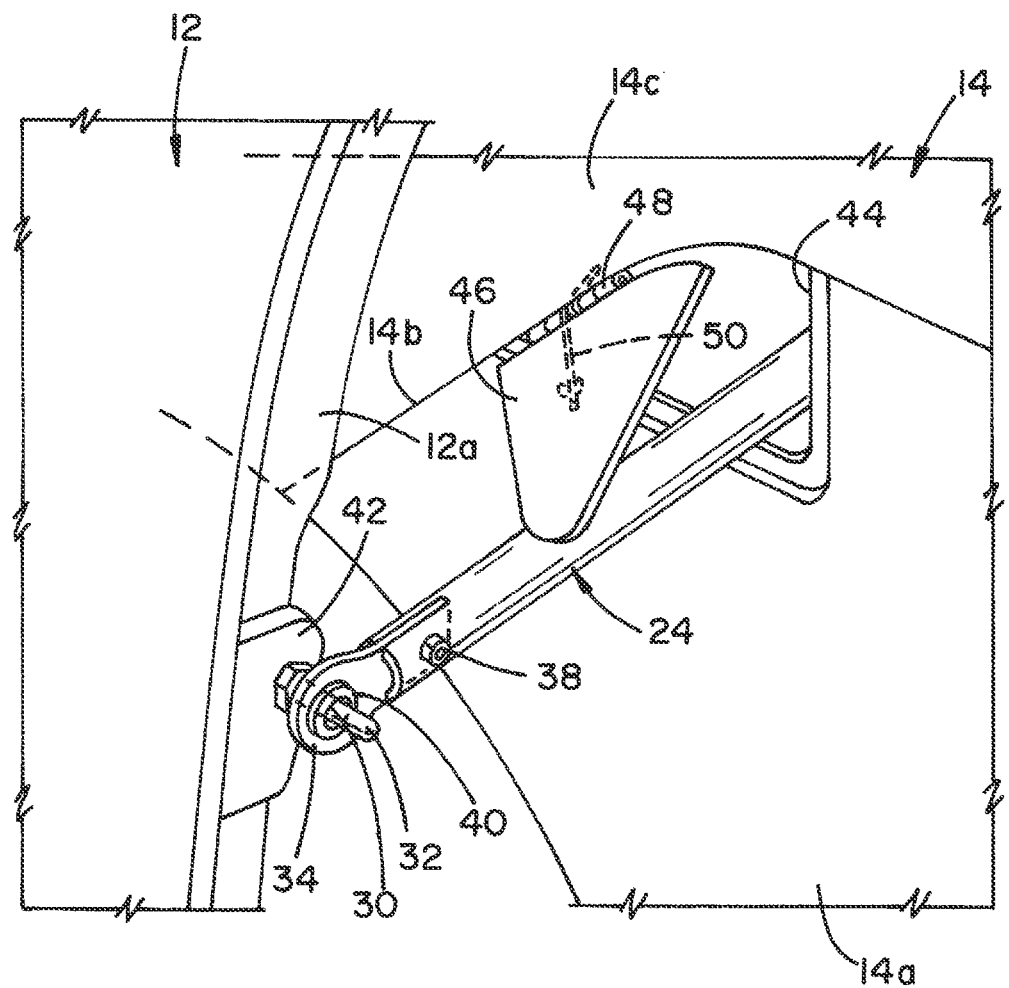
FIG. 7 is a partial schematic perspective view similar to FIGS. 5 and 6 but showing the extension member cooperatively engaged with the side door.
Figure 8:
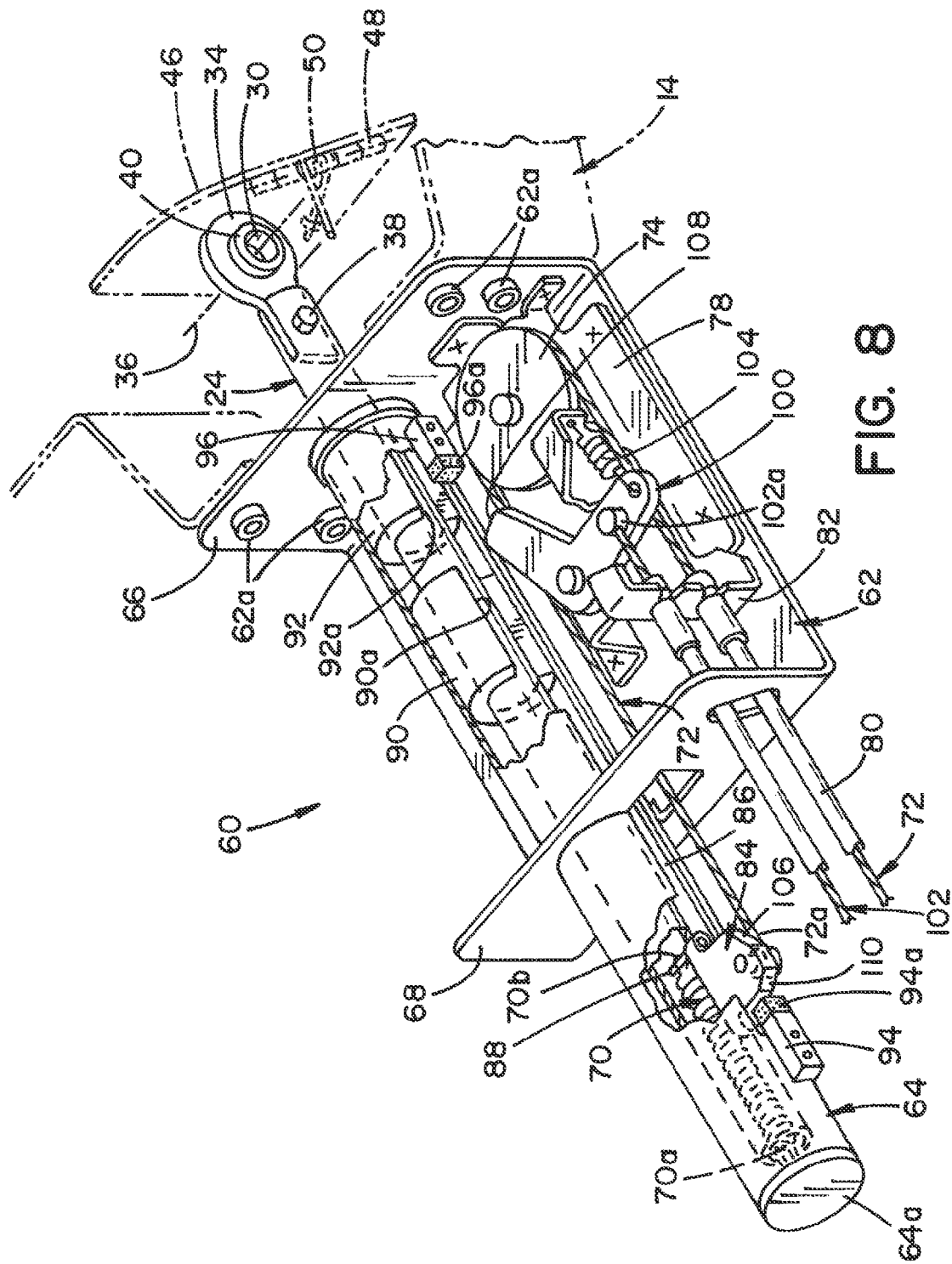
FIG. 8 is a perspective view of a movement control mechanism for moving the extension member between the retracted position and the extended position based on movement of the side door (the extension member shown in the retracted position).

With further reference to FIGS. 5, 6 and 7, the side door 12 and the extension member 24 can cooperatively engage one another when the side door 12 is moved to the open position and the extension member 24 is moved to the extended position. Accordingly, the extension member 24 and the side door 12 can cooperatively engage when the extension member 24 is in the extended position and the side door 12 is moved to the open position to thereby support a rear edge 12a of the side door 12. As will be described in more detail below, the cooperative engagement between the extension member 24 and the side door 12 can inhibit movement of the side door 12, such as relative to the vehicle 10. In particular, in one embodiment, the cooperative engagement can inhibit at least one of: vertical movement of the side door in the upward and downward directions, or lateral movement of the side door 12 in laterally inward and laterally outward directions. In the illustrated embodiment, the cooperative engagement inhibits both vertical movement of the side door in the upward and downward directions, and lateral movement of the side door 12 in laterally inward and laterally outward directions. Optionally, the cooperative engagement between the extension member 24 and the side door 12 can inhibit movement of the side door 12 in the rearward direction relative to a forward direction of travel for the vehicle 10, though one or more stops (not shown) may instead be used to limit movement of the side door 12 in the rearward direction.

For facilitating such cooperative engagement, in one embodiment, one of the side door 12 and the extension member 24 can include an aperture 30 and the other of the side door 12 and the extension member 24 can include a pin 32 receivable in the aperture 30 when the side door 12 and the extension member 24 cooperatively engage one another. In the illustrated embodiment, a distal end 34 of the extension member 24 includes the aperture 30 defined therethrough and the side door 12 includes the pin 32 that is receivable in the aperture 30 of the extension member 24. This arrangement can inhibit the side door 12 via receipt of the pin 32 through the aperture 30 from movement in both upward and downward directions and/or from movement in both laterally inwardly and laterally outwardly directions.

More specific to the illustrated embodiment, the aperture 30 can be configured as a pin receiver defined along an axis 36 that is defined through the distal end 34 of the extension member 24 and arranged to receive the pin 32 when the side door 12 is moved to the open position. The distal end 34 can be a finger member or end fitting secured via a fastener 38 (e.g., a bolt). Optionally, the aperture 30 defined in the distal end 34 can have a annular bushing 40, though this is not required. The pin 32 can be specifically secured to the rear edge 12a of the side door 12 such as via the illustrated fastening plate 42, though this is not required. Though not shown, in an alternative embodiment, the pin 32 could be disposed on the distal end 34 of the extension member 24 and received in an aperture defined in the rear edge 12a of the side door 12 or by some other similarly advantageous arrangement. For example, a protruding member could be provided on one the side door 12 and the extension member 24 and a cooperating recess could be provided on the other of the side door 12 and the extension member 24 to provide the cooperating relationship.

Movement of the extension member 24 from the retracted position to the extended position is shown in sequence in FIGS. 5, 6 and 7. As shown in FIG. 5, the extension member 24 is initially in the retracted position. In this position, the extension member 24 is received completely within the vehicle body 14 (e.g., laterally inwardly) and can be concealed within the vehicle body 14. The extension member 24 can move from this position to the extended position shown in both FIGS. 6 and 7. As best shown in FIG. 6, the extension member 24 reaches the extended position prior to the side door 12 reaching the open position when the side door 12 is moved from the closed position to the open position. This advantageously positions the aperture 30 to receive the pin 32 when the side door 12 finally reaches the open position, which is shown in FIG. 7.

More particularly, and as shown in FIGS. 6 and 7, the extension member 24 protrudes outside the vehicle body 14 and through a vehicle body aperture 44 defined in the vehicle body 14 when moving toward and when positioned in the extended position. A moveable cover 46 is arranged in association with the vehicle body aperture 44. In particular, the moveable cover 46 closes the vehicle body aperture 44 when the extension member 24 is in the retracted position as shown in FIG. 5 to conceal the extension member 24 and is moveable to a moveable cover open position (shown in FIGS. 6 and 7) when the extension member 24 is moved to the extended position. In the illustrated embodiment, the moveable cover 46 is pivotally mounted to the vehicle body 14 via a hinge 48. Optionally, and as shown in the illustrated embodiment, the vehicle body aperture 44 is defined within a body panel 14a of the vehicle body 14 adjacent an edge 14b of the vehicle body panel 14a where the vehicle body panel 14a mates with another vehicle body panel 14c of the vehicle body 14. This advantageously conceals the moveable cover 46 and maintains styling and appearance of the vehicle 10.

Movement of the moveable cover 46 between the closed position of FIG. 5 and the open position of FIGS. 6 and 7 can be associated with movement of the extension member 24. For example, in one embodiment, for opening the movable cover 46 from the closed position to the open position, the extension member 24 can simply push the moveable cover 46 from the closed position to the open position as the extension member 24 moves from the retracted position to the extended position. In one alternate embodiment, and not shown herein, the movable cover 46 could be opened through a mechanical linkage or could be separately driven by a motor and actuator via commands issued from an electronic control unit. In another alternate embodiment, also not shown herein, the moveable cover 46 can be fitted or fixedly secured to the distal end 34 and move with therewith.

Also for example, in one embodiment, closing of the moveable cover can occur when the extension member 24 moves from the extended position to the retracted position. For example, in one embodiment, a torsion spring 50 can bias or urge the moveable cover 46 toward its closed position. Opening of the moveable cover 46 can occur by the extension member 24 contacting the moveable cover 46 and pushing the moveable cover 46 open against the urging of the torsion spring 50. When the extension member 24 is moved to the retracted position, the torsion spring 50 can cause the moveable cover 46 to close. Thus, as the distal end 34 passes back through the vehicle body aperture 44 and into the vehicle body 14, the moveable cover 46 can be actuated (i.e., closed) by the torsion spring 50 to flip back toward the closed position. In one alternate embodiment, and not shown herein, the movable cover 46 could be closed through a mechanical linkage or could be separately driven by a motor and actuator via commands issued from an electronic control unit. In another alternate embodiment, as already mentioned, the moveable cover 46 can be fitted or fixedly secured to the distal end 34 and move with therewith such that closing in accomplished by returning the extension member 24 to the retracted position. In still a further alternate embodiment not shown herein, a cooperative arrangement can be provided between the moveable cover 46 and the extension member 24 whereby a structural feature (e.g., a hook) on the extension member 24 grabs a corresponding structure on the moveable cover 46 to pull close the moveable cover 46 as the extension member 24 is moved to the retracted position.

Figure 9:
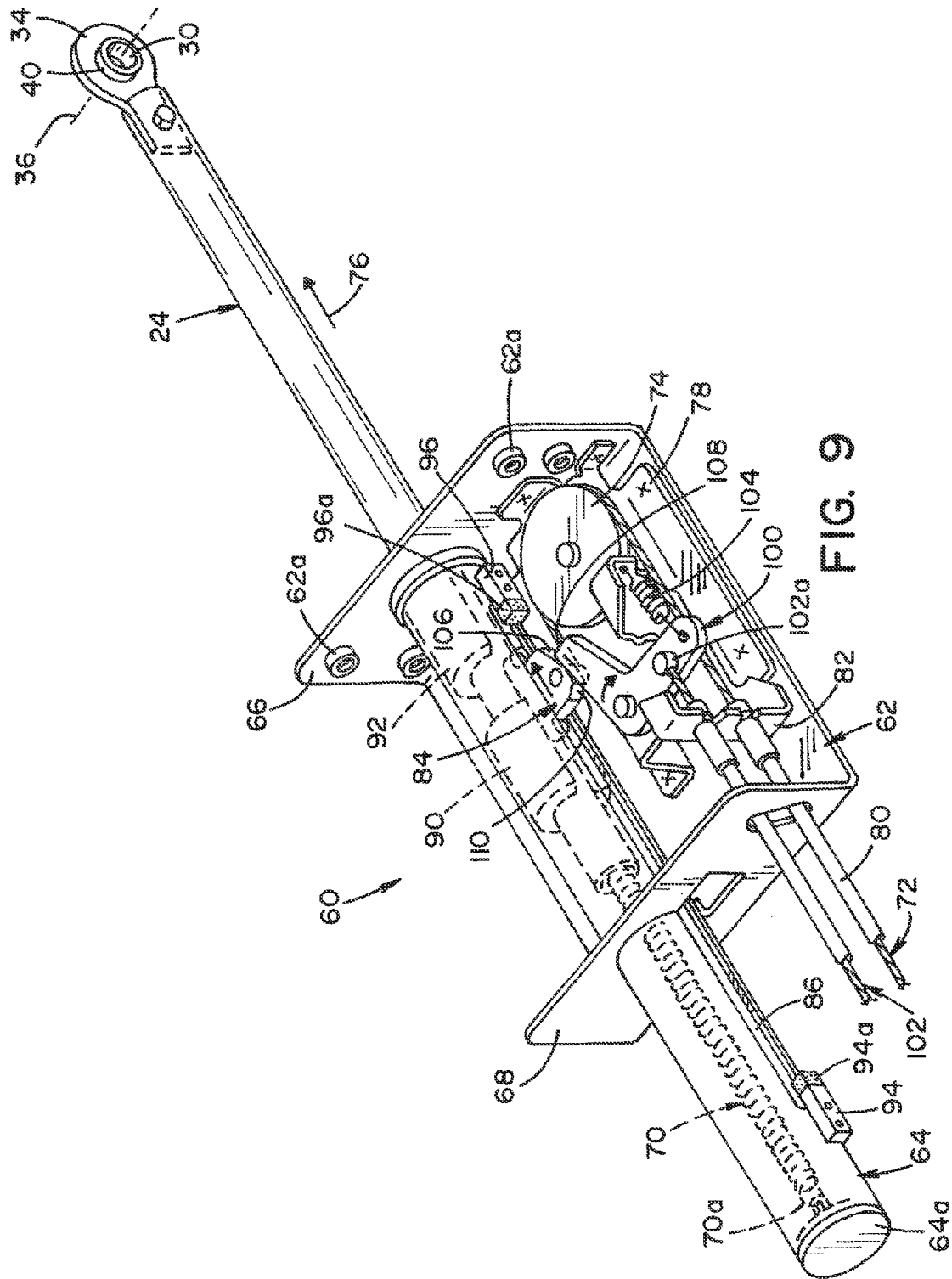
FIG. 9 is a perspective view of the movement control mechanism similar to FIG. 8 but showing the extension member moving toward the extended position.

With reference now to FIGS. 8-11, a movement control mechanism 60 is illustrated and is included as an additional part or element of the side door extension support assembly 22. As will be described in more detail herein, the movement control mechanism 60 controls movement of the extension member 24, including moving the extension member 24 between the retracted position shown in FIG. 8 and the extended position shown in FIG. 10. The extension member 24 is shown in FIG. 9 moving from the retracted position of FIG. 8 toward the extended position of FIG. 10. The extension member 24 is shown in FIG. 11 moving from the extended position of FIG. 10 toward the retracted position of FIG. 8.

In the illustrated embodiment, the movement control mechanism 60 includes a base part 62 that is mounted to the vehicle body 14 and provides a common structural mounting for other components of the movement control mechanism 60. This advantageously provides a modular construction whereby components of the movement control mechanism 60 can all be mounted to the base part 62 (e.g., as a sub-assembly) and the base part 62 can be secured to the vehicle body 14 when appropriate or desired during the manufacturing process. As shown, a guide tube 64 is mounted to the vehicle body 14 via the base part 62 and in which the extension member 24 is telescopingly received for linear translating movement between the extended position and the retracted position. More particularly, the guide tube 64 is mounted through flange panels 66, 68 of the base part 62 and secured thereto such as via welding or some other means, and thereby mounted to the vehicle body 14. The base part 62 can be secured to the vehicle body 14 via any suitable fastener, such as the illustrated weld nuts 62a. As shown, the movement control mechanism 60 can include a biasing mechanism 70 that urges the extension member 24 toward the retracted position. In the illustrated embodiment, the biasing mechanism 70 is a spring received in the guide tube 64 to urge the extension member 24 towards a retracted position. In the illustrated embodiment, one end 70a of the spring 70 can be secured to an inward end 64a of the guide tube 64 and an opposite end 70b of the spring 70 can be secured to the extension member 24 as more described below.

The movement control mechanism 60 can also include an extending cable 72 having one end 72a secured to the extension member 24 to move the extension member 24 against the urging of the spring 70 toward the extended position when the extending cable 72 is pulled. The movement control mechanism 60 can further include a pulley 74 rotatably mounted to the base part 62 and around which the extending cable 72 is received to redirect pulling motion of the extending cable 72 in a laterally inward direction into movement of the extension member 24 in an opposite, laterally outward direction as illustrated by the arrow 76 in FIG. 9. In particular, the pulley 74 is secured to the base part 62 by an intermediate mounting plate 78 in the illustrated embodiment and the extending cable 72 can be received through a sheath 80 having an end thereof fixed to a flange panel 82 of the intermediate mounting plate 78.

In particular, in the illustrated embodiment, the movement control mechanism 60 also includes a key member 84 fixed to the extension member 24 and received through a slot 86 defined in the guide tube 64. By way of example, the key member 84 can be secured to the extension member 24 via press fit or some other securement type could be used. The end 72a of the extending cable 72 can be secured to the key member 84 such that pulling of the extending cable 72 is translated into movement of the extension member 24 by the key member 84 since the key member 84 is fixed to the extension member 24. Accordingly, by this arrangement, the key member 84 is fixed to the extension member 24 and does not move relative to the extension member 24 so that pulling of the extending cable 72 results in movement of the extension member 24. The cooperative engagement between the key member 84 and the slot 86 fixes the angular orientation of the extension member 24 relative to the guide tube 64 and thereby relative to the base part 62. The end 70b of the spring 70 attached to the extension member 24 can specifically be attached to the key member 84, and more particularly to a pin 88 thereof, so that the extension member 24 is urged by the spring 70 toward the retracted position of FIG. 8.

Linear guide bearings 90, 92 can be interposed between the guide tube 64 and the extension member 24 for guiding movement of the extension member 24 relative to the guide tube 64. By way of example, the linear guide bearings 90, 92 can be fixed inside the guide tube 64 by press fit or by set screw (not shown). Slots 90a, 92a can be cut in the linear guide bearings 90, 92, respectively, to allow for movement of the key member 84 relative to the guide tube 64. Stops 94, 96 are mounted to the guide tube 64 and limit travel of the key member 84 relative to the guide tube 64 and thereby limit telescoping movement of the extension member 24 relative to guide tube 64. Resilient bumpers 94a, 96a (e.g., made of rubber) can be provided, respectively, on the stops 94, 96 to reduce noise and impact force.

Figure 10:
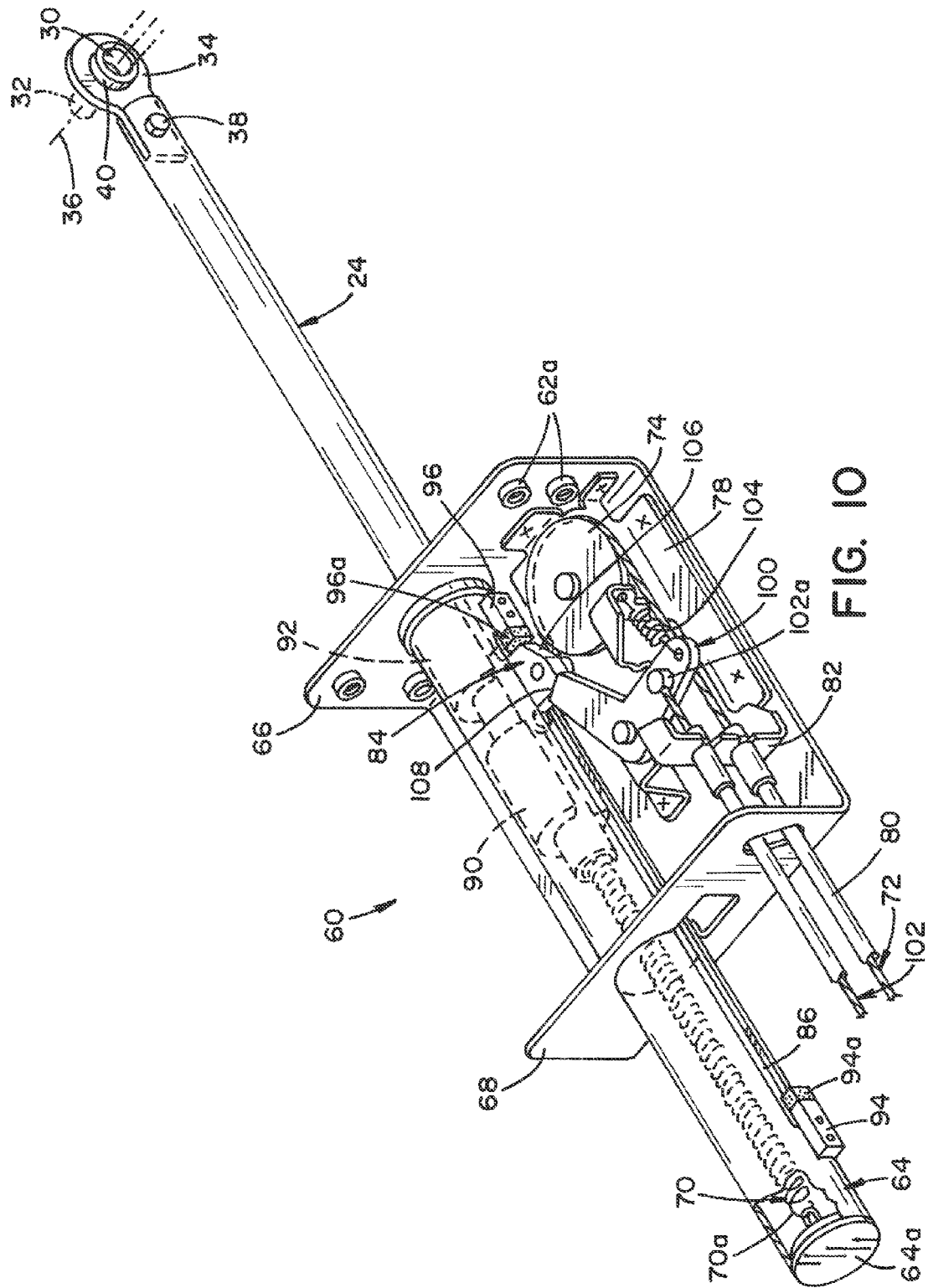
FIG. 10 is another perspective view of the movement control mechanism similar to FIG. 8 but showing the extension member in the extended position.

The movement control mechanism 60 can further include a latch member 100 moveable between a latched position shown in FIG. 10 and an unlatched position shown in FIG. 11. The latch member 100 can lock the extension member 24 in the extended position, as shown in FIG. 10, when the extension member 24 is in the extended position and the latch member 100 is in the latched position. A retracting cable 102 can have one end 102a secured to the latch member 100 for moving the latch member 100 to the unlatched position when the retracting cable 102 is pulled. A latch spring 104 is arranged on the base part 62 to urge the latch 100 toward the latched position. Pulling of the retracting cable 102 moves the latch 100 to the unlatched position against the urging of the latch spring 104.

In particular, in the illustrated embodiment, the latch member 100 engages the key member 84 to lock the extension member 24 in the extended position when the extension member 24 is in the extended position and the latch member 100 is in the latched position. Normally, as shown in FIG. 9, the key member 84 can travel past the latch 100 and itself slightly moves the latch member 100 toward the unlatched position against the urging of the latch spring 104. Such movement is facilitated by the tapered side 106 of the key member 84. Locking surface 108 of the latch 100, which is generally flat, engages a locking surface (or surfaces) 110 of the key member 84 after the key member 84 travels past the latch 100. To release the key member 84, the retracting cable 102 is pulled to thereby move the latch member 100 to the unlatched position and allow movement of the key member, specifically back from the position shown in FIG. 10 toward the position shown in FIG. 8. Such unlatching is illustrated in FIG. 11.

In operation, the extension cable 72 can be pulled (e.g., by the door actuator 28), which drives the extension member 24 toward the extended position via the pulley 74 and key member 84. As the extension member 24 moves from the retracted position to the extended position, the extension member 24 and the key member 84 travel relative to the guide tube 64. The extension member 24 can push open the moveable cover 46 while moving toward the extended position. Simultaneously, the tapered side 106 of the key member 84 pushes the latch 100 away from the guide tube 64 and the key member 84 passes beyond it. Once the key member 84 has passed the latch 100, the latch 100 moves back to the latched position via the urging of the latch spring 104. Travel beyond the extended position by the extension member 24 is limited by the stop 96 as well as the end of the stroke on the extending cable 72. The spring 70 pulls the extension member 24 and the key member 84 against the latch 100.

In particular, the locking side 110 engages and is pulled against the locking side 108 to maintain the extension member 24 in the extended position. The extension member 24 reaches the extended position prior to the side door 12 reaching the open position. Accordingly, when the side door 12 reaches the open position, the pin 32 on the side door 12 cooperatively engages the aperture 30 defined in the distal end 34 of the extension member 24. Thus, the rear edge 12a of the side door 12 receives support from the extension member 24 thereby transferring loads in the vertical and vehicle transverse directions back to the vehicle body 14.

When the side door 12 is moved from the open position to the closed position, the pin 32 slides out of the aperture 30. The retraction cable 102 can be pulled (e.g., by the door actuator 28), which frees the key member 84 to move back and allows the extension member 24 to move to the retracted position. Pulled by the spring 70, the key member 84 and the extension member 24 move back laterally inwardly toward the retracted position pulling the extension cable 72 therealong. As the distal end 34 passes back through the vehicle body aperture 44 and into the vehicle body 14, the moveable cover 46 can be actuated (i.e., closed) by the torsion spring 50 to flip back toward the closed position.

A side door extension support method for a vehicle will now be described. In particular, the method will be described in association with the side door extension support assembly 22 described hereinabove, though this is not required and the method could be used with other assemblies. In the method, the side door 12 mounted on the vehicle 10 for longitudinal movement between the closed position and the open position is provided. The extension member 24 mounted to the vehicle 10 for movement between the retracted position and the extended position for supporting the side door 12 is also provided. In operation, the side door 12 is moved between the closed position and the open position. The extension member 24 is moved between the retracted position and the extended position based on movement of the side door 12. In particular, the extension member 24 is moved to the extended position when the side door 12 is moved from the closed position to the open position and the extension member 24 is moved to the retracted position when the side door 12 is moved from the open position to the closed position.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A side door extension support assembly for a vehicle, comprising:
   a side door movably mounted on a vehicle body of the vehicle and longitudinally movable between a closed position and an open position; and
   an extension member mounted to the vehicle body and laterally movable between a retracted position and an extended position for supporting the side door, lateral movement of the extension member corresponding to movement of the side door such that the extension member laterally moves to the extended position when the side door is moved from the closed position to the open position, and the extension member laterally moves to the retracted position when the side door is moved from the open position to the closed position, wherein the extension member reaches the extended position prior to the side door reaching the open position when the side door is moved from the closed position to the open position.

2. The side door extension support assembly of claim 1 wherein the side door and the extension member cooperatively engage one another when the side door is moved to the open position and the extension member is moved to the extended position.

3. The side door extension support assembly of claim 2 wherein one of the side door and the extension member includes an aperture and the other of the side door and the extension member includes a pin receivable in the aperture when the side door and the extension member cooperatively engage one another.

4. The side door extension support assembly of claim 3 wherein a distal end of the extension member includes the aperture defined therethrough and the side door includes the pin that is receivable in the aperture of the extension member.

5. The side door extension support assembly of claim 1 wherein the extension member is received completely within the vehicle body when in the retracted position and wherein the extension member protrudes outside the vehicle body and through a vehicle body aperture defined in the vehicle body when in the extended position.

6. The side door extension support assembly of claim 5 further including:
a movable cover arranged in association with the vehicle body aperture, the movable cover closing the vehicle body aperture when the extension member is in the retracted position to conceal the extension member and movable to a cover open position when the extension member is moved to the extended position.

7. The side door extension support assembly of claim 1 further including:
a biasing mechanism that urges the extension member toward the retracted position; and
an extending cable having one end secured to the extension member to move the extension member against the urging of the biasing mechanism toward the extended position when the extending cable is pulled.

8. The side door extension support assembly of claim 1 further including:
a latch member movable between a latched position and an unlatched position, the latch member locking the extension member in the extended position when the extension member is in the extended position and the latch member is in the latched position; and
a retracting cable having one secured to the latch member for moving the latch member to the unlatched position when the retracting cable is pulled.

9. The side door extension support assembly of claim 8 further including:
a latch spring urging the latch toward the latched position, and wherein pulling of the retracting cable moves the latch to the unlatched position against the urging of the latch spring.

10. The side door extension support assembly of claim 1 further including:
a guide tube mounted to the vehicle body and in which the extension member is telescopingly received for movement between the extended position and the retracted position.

11. The side door extension support assembly of claim 10 further including:
a spring received in the guide tube to urge the extension member toward the retracted position; and
an extending cable having one end secured to the extension member to move the extension member against the urging of the spring toward the extended position.

12. The side door extension support assembly of claim 10 further including:
a pulley around which the extending cable is received to redirect pulling motion of extending cable in a laterally inward direction into movement of the extension member in an opposite, laterally outward direction.

13. The side door extension support assembly of claim 10 further including:
a key member fixed to the extension member and received through a slot defined in the guide tube, the one end of the extending cable secured to the key member such that pulling of the cable is translated into movement of the extension member by the key member.

14. The side door extension support assembly of claim 13 further including:
a latch member movable between a latched position and an unlatched position, the latch member engaging the key member to lock the extension member in the extended position when the extension member is in the extended position and the latch member is in the latched position;
a retracting cable having one secured to the latch member for moving the latch member to the unlatched position when the retracting cable is pulled and allowing movement of the key member; and
a latch spring urging the latch toward the latched position, and wherein pulling of the retracting cable moves the latch to the unlatched position against the urging of the latch spring.

15. A side door assembly on a vehicle, comprising:
a side door mounted on a lateral side of the vehicle for closing a door opening providing ingress and egress for the vehicle, the side door longitudinally movable from a closed position wherein the side door closes the door opening to an open position wherein the side door is removed from the door opening;
an extension member mounted on the lateral side of the vehicle rearwardly of the door opening for supporting the side door when the side door is in the open position, the extension member movable from a retracted position wherein the extension member is laterally spaced apart from the side door when the side door is in the open position to an extended position wherein the extension member engages the side door when the side door is in the open position, the extension member moving from the retracted position to the extended position when the side door is longitudinally moved to the open position; and
at least one cable having a first end operatively connected to the extension member for moving the extension member from at least one of the retracted position or the extended position to the other of the retracted position or the extended position, the at least one cable having a second end arranged relative to the side door so as to pull the at least one cable when the side door is moved.

16. The side door assembly of claim 15 wherein the extension member and the side door cooperatively engage when the extension member is in the extended position and the side door is moved to the open position to support a rear edge of the side door.

17. The side door assembly of claim 15 wherein the cooperative engagement inhibits at least one of: vertical movement of the side door in upward and downward directions and lateral movement of the side door in laterally inward and laterally outward directions.

18. The side door extension support assembly of claim 15 wherein the extension member reaches the extended position prior to the side door reaching the open position when the side door is moved to the open position.

19. A side door extension support method for a vehicle, comprising:
   providing a side door movably mounted on the vehicle for longitudinal movement between a closed position and an open position;
   providing an extension member mounted to the vehicle for movement between a retracted position and an extended position for supporting the side door;
   moving the side door between the closed position and the open position;
   laterally moving the extension member between the retracted position and the extended position based on movement of the side door, the extension member moved to the extended position when the side door is moved from the closed position to the open position and the extension member moved to the retracted position when the side door is moved from the open position to the closed position, wherein the extension member reaches the extended position prior to the side door reaching the open position when the side door is moved from the closed position to the open position.

* * * * *